Dec. 10, 1968  H. E. THOMASON ETAL  3,415,126

AZIMUTH LAYING SYSTEM

Filed Sept. 25, 1964  2 Sheets-Sheet 1

HERMAN E. THOMASON,
CARL H. MANDEL,
INVENTORS

BY
E. Smallwood
ATTORNEYS

Dec. 10, 1968        H. E. THOMASON ETAL        3,415,126
                       AZIMUTH LAYING SYSTEM
Filed Sept. 25, 1964                          2 Sheets-Sheet 2

HERMAN E. THOMASON,
CARL H. MANDEL,
INVENTORS

BY
ATTORNEYS

United States Patent Office 3,415,126
Patented Dec. 10, 1968

3,415,126
AZIMUTH LAYING SYSTEM
Herman E. Thomason, Huntsville, and Carl H. Mandel, Madison, Ala., assignors to the United States of America as represented by the Administrator of the National Aeronautics and Space Administration
Filed Sept. 25, 1964, Ser. No. 399,419
5 Claims. (Cl. 74—5.47)

ABSTRACT OF THE DISCLOSURE

An azimuth alignment system for a stable platform. A synchro transmitter assembly is mounted on an end of the platform's gimbal axle with its stator and rotor co-axial to the gimbal axle. The rotor is rigidly connected to the gimbal axle whereby rotation of the platform about the axis of the gimbal axle will rotate the rotor. A first prism is mounted on the stable platform and a second prism is mounted on the transmitter's stator. A theodolite is provided to establish the initial position of the stable platform by aligning the prisms along a known line. Control means are also provided for rotation of the stable platform about the gimbal axle according to a predetermined time function azimuth program based on the initial alignment of the stable platform.

---

The invention described herein may be manufactured and used by or for the Government of the United States of America for governmental purposes without the payment of any royalties thereon or therefor.

This invention relates generally to the alignment of the inertial gimbal of a missile's stable platform prior to launch. More particularly, the invention relates to an inertial gimbal alignment system in which the alignment azimuth is a function of time.

The key to the guidance system of space vehicles is an inertial stable platform upon which sensitive devices are positioned to detect components of displacement, velocity, and acceleration, both linear and angular. This information is stored in the guidance system computer memory for use in making whatever corrections are called for by computed deviations from the program of the mission. The orientation of the guidance system stable platform must be based on a space, i.e., navigational, coordinate system and not on a vehicle coordinate system. It may be recalled that the basic maneuvers an in-flight vehicle is capable of performing are pitch, roll, and yaw maneuvers, and, for that reason, ambiguities may arise in the attitude of the vehicle if these three mutually orthogonal vehicle axes were used as a coordinate system because the order in which rotational corrections are made about these axes will affect the resultant attitude of the vehicle. This is easily seen if a model, for example a book, is rotated through 90° about each of the pitch, roll and yaw axes (say nose up pitch, right wing up roll and nose left yaw) in that order and then perform the same maneuvers except with the order changed to roll, pitch and yaw. An earth coordinate system would, of course, not be adequate because of the movement of these axes with time (with the possible exception of a polar axis). In order to solve the "order of executing maneuvers" problem indicated above, a space orientated navigational coordinate system had to be established, and additionally, an "Euler angle" approach to vehicle altitude adjustments was implemented.

The selected navigational coordinate system orientation is fixed in space based, in one coordinate direction, on the position of the stable platform inertial gimbal relative to the center of the earth at launch, i.e., one coordinate direction is along the local gravity vector at the instant of launch. The other two cartesian coordinate directions are also established at the time of launch with one of the coordinate directions along the azimuth heading prescribed by the mission program based on the time of launch.

It can be seen that for a mission involving rendezvous with any non-earth bound body, an earth satellite for example, the azimuth or mission heading will not be fixed but rather it will be a non-linear function of the time of launch. For this reason, the inertial gimbal orientation must be continuously corrected prior to launch to the desired azimuth for the mission if the missile were launched at that instant so that when launch is affected, the navigational coordinate system will be properly oriented. The problem is thus easily understood: To accurately erect, align and continuously correct the alignment of the inertial gimbal of the stable platform prior to launch so that at launch the space or navigational coordinate system will be of a fixed orientation in space with one coordinate axis along the flight path or mission azimuth of the vehicle and one along the local vertical vector. The establishment of these two axes will automatically establish the direction of the third axis if there is a predetermined rule of axis orientation such as a right hand rule, etc.

Pendulums can be utilized to determine a local vertical vector; however, they cannot detect any particular horizontal direction. The establishment of a horizontal reference direction is necessary and must be accomplished on the ground prior to launch. The accuracy of the orientation of the navigational coordinate system with reference to a horizontal reference direction is critical because of the effects of slight angular errors when the very large distances involved are considered. For a small angle $\theta$, the trigonometric function, tangent $\theta$, can be considered equal to the value of $\theta$ in radians. This is a small but positive number. The off-course error corresponding to any non-zero angle can be made arbitrarily large if the distance involved is sufficiently large. The immediate consideration is, of course, an earth to earth-satellite distance. Simple mathematical calculations will show that an angular error of one arc minute will give a linear error of approximately one hundred miles at the distance on the order of the distance from the earth to the moon. For this reason, performance requirements are put on the azimuth laying system utilized to establish and correct the navigational coordinate system azimuth axis to the time functional mission azimuth of the Saturn class of vehicles; and a criterion of 0.01° (36 arc seconds) total anticipated system error has been established.

The azimuth laying problem of military ballistic missile systems is different from that of the Saturn vehicle systems in that the firing azimuth of military systems is predetermined and is not time functional. Generally, in such systems, the firing azimuth is established as a known direction and, through the use of optical alignment techniques, the inertial gimbal of the missile stable platform is aligned to this known direction. The use of a theodolite is common in these applications with the "line-of-sight" of the theodolite along the known (firing azimuth) direction. A reflecting prism is mounted on the intertial gimbal and radiant energy from the theodolite is reflected back to the theodolite by the prism. When the prism is in acquisition by the theodolite, theodolite light detectors have a null signal output and the inertial gimbal will be aligned to a desired azimuth.

Thus in establishing the azimuth orientation of the stable platform inertial gimbal, the theodolite line of sight is pre-established on a Class A survey line to coincide with the mission azimuth. Prior to launch the vehicle is positioned on the launch pad and the proper alignment accomplished at any time prior to launch. Additionally it has been the practice in military ballistic missile systems to provide the capability of repositioning the vehicle on the launch pad if this becomes necessary prior to launch. Thus in these systems the mission azimuth is established by aligning the inertial gimbal of a stable platform by a ground-based theodolite and maintaining the alignment by an electro-optical servo loop until the time of launch.

A typical azimuth alignment theodolite utilized in the alignment of the inertial gimbal of a missile's stable platform is provided with the capability of operation at distances from 300 to 1000 feet from the position of the reflective element on the stable platform and at elevation angles of up to approximately 40°. In space probe applications the theodolite should be capable of measuring azimuth deviation angles, that is, prism rotations from a known direction based on a Class A survey used in the establishment of the theodolite position, of up to plus or minus one minute with a five second accuracy. This capability is achieved in the presence of a plus or minus three inches of dynamic vehicle sway and plus or minus 12 inches of long term deflection of the vehicle. These instruments include, typically, an eight-inch aperture, automatic null-sensing autocollimator whose line of sight is directed through a movable penta mirror to the stable platform inertial gimbal reference prism. The plus or minus three inches of dynamic vehicle sway, caused mainly by gust wind forces and the effects of gantry movement, is compensated by the eight inch aperture, while the plus or minus 12 inches of long term deflection vehicle sway, caused by uneven heating of the vehicle by the sun inducing flexure of the vehicle and by shrinkage associated with fuel weight and cryogenic effects, is provided by an errorless compensation by penta mirror translation.

The autocollimator and the translating penta mirror are supported on a lathe-bed type base. The penta mirror deviates the autocollimator light beam to the stable platform prism through an angle of 90°, typically, and the radiant energy is reflected back to the autocollimator and generates an error signal whenever the prism rotates from the desired azimuth orientation. The penta mirror is remotely controlled through a servo loop which translates the penta to maintain the platform prisms centered in the field of view of the autocollimator theodolite. Penta deviation is unaffected by small rotations of the penta mirror, thus the alignment direction established by the autocollimator theodolite is unchanged by prism translation. Typically, the autocollimator consists of an 8 inch off-axis Maksutov Catadioptric lens of about 30 inch focal length with automatic sensing means at its focus. Light from an incandescent lamp, made alternately incident on either side of a split prism nose by a motor driven chopper, is reflected to an objective lens, collimated, transmitted to the stable platform prism and reflected back to the objective lens which reimages the illuminated slit in its own plane at unity magnification. If the platform prism is not precisely normal to the autocollimator axis, or, with the use of a penta mirror arrangement, the deviated light beam direction, the returned image will be displaced laterally on the slit and light of one phase will be incident upon a lead sulfide (PbS) detector. The magnitude of the signal incident on the lead sulfide detector will be proportional to the prism deviation from null, and the signal phase will indicate the direction of the deviation.

One of the important design features of the theodolite is the use of a movable penta mirror to provide initial positioning of a line of sight, large amplitude sway compensation, and convenient access to a reference prism. The penta mirror is a constant deviation device which permits translating the transmitted beam precisely parallel to itself in the presence of small penta angular disturbances. The penta mirror in a typical application would consist of 2 mirrors facing each other, their planes intersecting at an angle of $\pi/4$ radians. Light from the autocollimator would impinge on one of the reflective surfaces, be reflected to the other surface, and reflected from the latter surface to the stable platform prism. With a $\pi/4$ angular difference in the planes of the two mirrors, a constant $\pi/2$ deviation in the transmitted light beam will occur regardless of the angle of incidence of the transmitted light beam on the first of the two reflective surfaces.

Thus in such missile systems not requiring a capability of having the launch azimuth vary with time, a ground-based theodolite system is utilized in which the direction of the theodolite's line-of-sight is predetermined and is coincident with the missile launch azimuth. An optical device (prism) which reflects light at an angle dependent on the angle of incidence of the incoming light with respect to one axis of the device but which reflects light always parallel to the incident light with respect to a second axis perpendicular to the first axis can be used to advantage since only the detection of horizontal angular changes is required in the alignment problem. Such a device, referred to above as a prism, can easily be visualized as any reflective element which consists of two mutually perpendicular plane reflecting surfaces. Light rays incident on one of the reflecting surfaces will be reflected on to the other surface and reflected by the second surface in a generally opposite direction of the incident light rays. It can be seen that the reflected light rays will be parallel to the incident light rays with respect to a plane normal to the line of intersection of two reflecting surfaces, while, at the same time, the reflected rays will have an angle of reflection equal to the angle of incidence of the incident light rays with respect to a plane in which the line of intersection of the two reflecting surfaces lies. In the particular application of interest here, the line of intersection of the two reflecting surfaces will be horizontal and a plane containing this line of intersection and the pental mirror will be the reference plane in which angular deviations are to be detected. The inertial gimbal can be aligned to the launch azimuth if a prism is mounted on the inertial gimbal and the gimbal is oriented so that light from the theodolite is reflected by the prism back into the theodolite parallel to the transmitted light beam thus maintaining the axis of the prism perpendicular to the fixed theodolite line of sight. With the inertial gimbal fixed to the launch azimuth, the missile may be launched knowing that the alignment of the stable platform's inertial gimbal is, to a high degree of accuracy, correct. The theodolite line-of-sight can be established on a Class A survey line since the launch azimuth is known well in advance of the launch time. In this application, the vehicle on the launch pad will have to be positioned so that the theodolite can "see" the prism on the inertial gimbal of the guidance system stable platform. In order to accommodate sway of the vehicle in the area of the stable platform, a penta mirror arrangement is provided which will allow the transmitted light beam to be displaced parallel to its original direction by linear translation of the penta mirror as pointed out above. (For a further more detailed description of a typical theodolite application see Vyce U.S. Patent No. 3,002,419, dated Oct. 3, 1961.)

In the Saturn class of vehicles this procedure cannot be followed in its entirety. The mass of the vehicle makes any attempt at launch pad repositioning impractical. The time functional azimuth missions of the Saturn vehicles and other future space probe systems in which the launch azimuth varies according to the time of launch make it impossible to directly align the inertial gimbal of the guidance system stable platform by a fixed line-of-sight ground based theodolite. With the 0.01° maximum anticipated error requirement, a new approach was dictated for the Saturn inertial platform alignment.

It is therefore an object of the present invention to provide an azimuth alignment system for the alignment of the inertial gimbal of a stable platform in a missile guidance system in which the azimuth is a function of the time of launch of the vehicle.

It is a further object of the invention to provide a time functional azimuth alignment system using closed loop electro-optical and electro-mechanical means.

It is still another object of the invention to provide a system for the alignment of the inertial gimbal of a stable platform utilizing a ground fixed line-of-sight as a reference.

These and other objects of the present invention, obvious to those skilled in the art, are accomplished by the use of a dual optical system to initially align the inertial gimbal of the missile's stable platform to a known azimuth and, using this known azimuth as a reference, establishing the alignment of the inertial gimbal as a variable deviation from the pre-established known azimuth. Both of the optical systems are used to establish the inertial gimbal alignment reference and the second system is used to maintain the reference thus established to very close tolerances.

Greater understanding of the invention may be obtained by reference to the following detailed description of an embodiment thereof taken in conjunction with the attached drawing in which.

Figure 1:
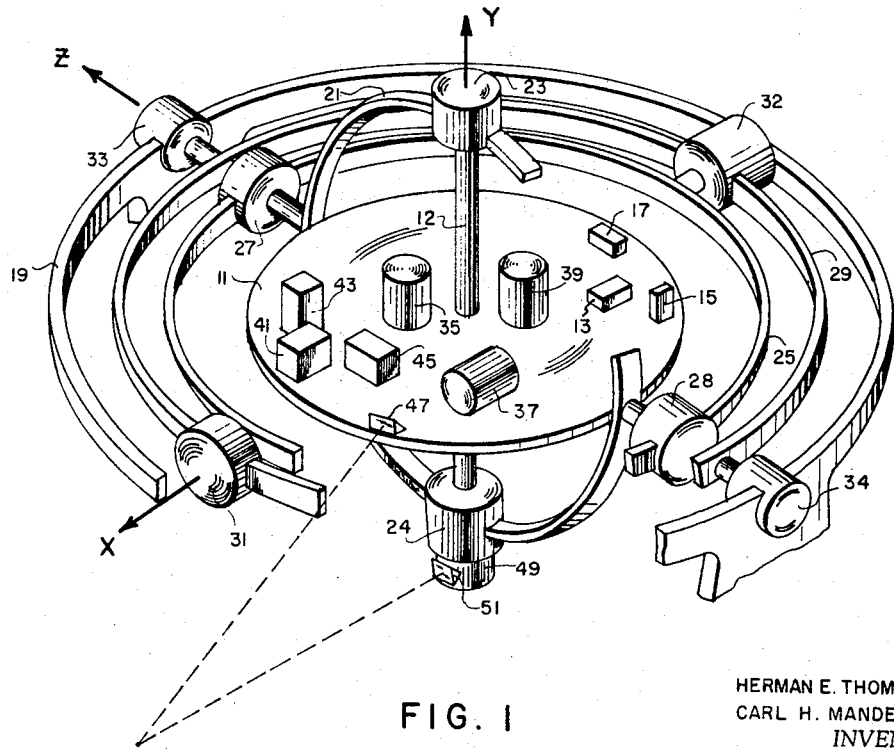
FIGURE 1 is a schematic view of a missile stable platform and the inertial gimbal thereof with a rectangular cartesian coordinate system indicated.

Referring now to the drawings wherein like reference numerals designate like or similar parts and particularly to FIGURE 1, there is shown, schematically, a guidance system stable platform having four gimbals. The stable platform inertial gimbal 11 (also called the inner gimbal) is rigidly mounted on inertial gimbal axle 12 and has rigidly attached thereto those elements which must be of fixed attitude orientation in space so that components of acceleration, velocity and displacement may be calculated from inertial forces in the respective coordinate directions. Also included on the stable platform will be stability devices for maintaining the attitude orientation of the stable platform inertial gimbal. There are provided three gas bearing pendulums, an X-axis pendulum 13, Y-axis pendulum 15 and Z-axis pendulum 17, which are oriented so as to detect a horizontal orientation of two of the three mutually orthogonal cartesian coordinate directions. Pendulums 13, 15 and 17 detect a horizontal direction, or deviations from the horizontal about the system of cartesian coordinate axes designated the X, Y and Z axis respectively which will be more fully described hereinafter. It can be seen that the inertial gimbal can be oriented with any of the three coordinate directions along the local vertical by requiring that the two pendulums associated with the other two coordinate axes detect a level or horizontal condition. The pendulum associated with the coordinate direction selected to be along the local gravity vector and will then detect merely the vertical direction (i.e the positive direction) along the coordinate axis selected. The pendulums 13, 15 and 17 are floating slug gas bearing pendulums, the construction of which is well known to those skilled in the art.

In order that the inertial gimbal 11 be freely positioned relative to the missile vehicle, it is attached to the vehicle frame 19 through a series of four pairs of gimbal pivots which have gimbal pivot resolvers associated therewith.

The inertial gimbal 11 is pivotally attached to a middle gimbal 21 at inertial-middle gimbal pivots 23 and 24; the middle gimbal 21 is pivotally attached to an outer gimbal 25 at middle-outer gimbal pivots 27 and 28; the outer gimbal 25 is pivotally attached to a redundant gimbal 29 at outer-redundant gimbal pivots 31 and 32. Finally the redundant gimbal 29 is pivotaly attached to the vehicale frame 19 at redundant gimbal-frame pivots 33 and 34. The inertial gimbal 11 can assume any orientation relative to the vehicle frame 19. This possibility, of course, exists even without one of the gimbals; the purpose of the redundant gimbal 29 is to preclude the possibility of a gimbal lock when each of the other three of the gimbals, 11, 21 and 25 lie in the same plane and a movement of the vehicle is made about an axis normal to this gimbal plane. It can be seen that in such a case, the inertial gimbal will rotate and not remain fixed in space as is required. The redundant gimbal and the resolvers associated therewith maintains the three inner pivots axes (23–24, 27–28, and 31–32) mutually perpendicular. The use and operation of the redundant gimbal is well known to those skilled in the art.

The stability of the inertial gimbal 11 is maintained by three gas bearing stabilization gyros, X-gyro 35, Y-gyro 37 and Z-gyro 39, oriented to provide gyroscopic stability in each of the three cartesian coordinate directions X, Y and Z, respectively. Additionally the gyros 35, 37 and 39 provide means of correcting the attitude orientation of the stable platform inertial gimbal 11 by conventional gyro torqueing techniques.

There are also mounted on the inertial gimbal three inertial force sensing gas bearing accelerometers, an X-accelerometer 41, Y-accelerometer 43 and Z-accelerometer 45, oriented and adapted to detect accelerations in the X, Y and Z coordinate directions, respectively. The detected accelerations are integrated to yield component velocities and integrated again to give component displacements.

The final element placed on the intertial gimbal 11 and shown in the schematic representation of the stable platform in FIGURE 1 is a "red" inertial gimbal prism 47 adapted to reflect light rays with a component parallel to the incident light rays projected on a vertical plane normal to the prism's apex line while the angle of incidence of the incident light rays equals the angle of reflection of the reflected rays projected on a horizontal plane. Thus only horizontal angular displacements of the prism will deflect the incoming light rays. The reason for designating the prism 47 on the inertial gimbal 11 "red" will be pointed out hereinafter in conjunction with the discussion of the optical alignment procedure.

Figure 2:
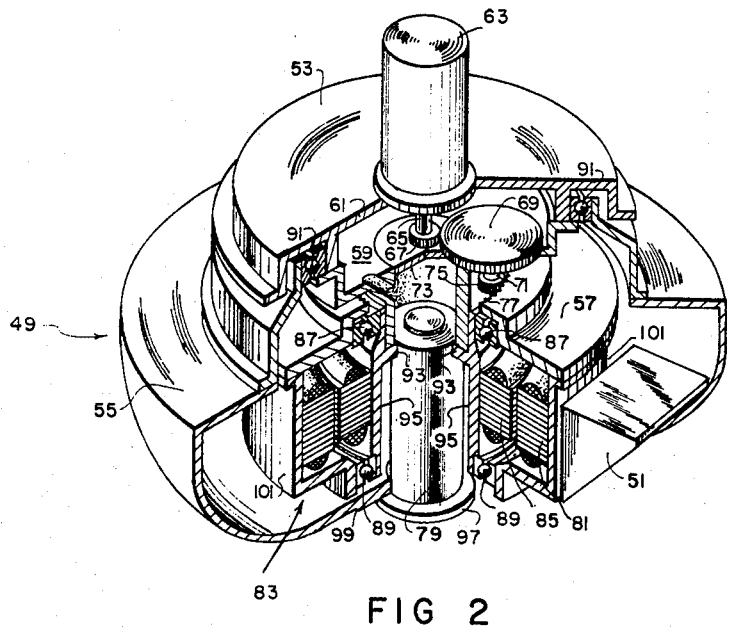
FIGURE 2 is a perspective view partly in section of the prism ring assembly shown in FIGURE 1.

Mounted on the inertial-middle gimbal pivot 24 is a prism ring assembly 49 having a "blue" prism ring prism 51 rigidly attached to a portion thereof (referred to hereinafter as a prism ring) which, while mounted on the pivot 24, is freely rotatable about the pivot axis 23–24 independently of both the inertial gimbal 11 and the middle gimbal 21. The construction of the prism ring assembly 49 is shown in FIGURE 2 to which attention is now directed.

The prism ring assembly 49 is shown in a cut-away view illustrating the three main co-axial portions thereof, an inner inertial gimbal mount 53, a middle gimbal mount 55 and a prism ring 57. Inertial gimbal mount 53 includes a gear housing 59 having an upper housing plate 61 upon which a prism ring servo motor 63 is mounted. Servo motor 63 has a drive shaft 65 extending through an aperture (not explicitly shown) in plate 61 with a drive gear 67 at the distal end thereof. In juxtaposition and in engagement with gear 67 is a reduction gear 69 mounted on a shaft 71 which extends through an aperture (not explicitly shown) in a lower gear housing plate 73. The apertures in the upper and lower gear housing plates 61 and 73 are different in that there need be no bearing contact between the drive shaft 65 extending through the upper plate 61 and the annular surface defining the aperture. On the other hand, the aperture in the lower bearing plate 73 serves also as a bearing surface for maintaining the longitudinal position of shaft 71 substantially parallel to shaft 65 while allowing relatively frictionless rotational freedom of the shaft. At the distal end of shaft 71 is a final drive gear 75 in juxtaposition and in engagement with a prism ring gear 77. Gear 77 is a part of prism ring 57 upon which the "blue" prism 51 is rigidly mounted. Also rigidly connected to and integral with prism ring 57 is a synchro transmitter stator 81 which is a part of a synchro transmitter 83. Synchro transmitter 83 also includes a synchro transmitter rotor 85. Synchro rotor 85 is rigidly connected to and is integral with inner gimbal mount 53, which, in turn, is rigidly connected to the inertial gimbal 11.

It is not important, from the standpoint of description, which of the prism ring assembly's three basic moving parts, the inertial gimbal mount 53, the middle gimbal mount 55, or prism ring 57, is considered to be stationary with the other two rotating relative to it about the co-linear axes of these three parts. The axis is colinear with inertial gimbal axis 23–24 and passes through prism ring servo motor 63, shaft 65 and a slip ring 79. However, for ease in a later discussion of the operation of the system as a whole, the slip ring 79 will be assumed to be fixed in space insofar as rotations about its axis, the axis mentioned above, is concerned.

There are two annular bearing contact areas between middle gimbal mount 55 and slip ring 79, an upper annular bearing 87 and a lower annular bearing 89. These bearings are constructed such that, while allowing relative rotational motion about their common axis, axial translation of one of the parts relative to the other is restrained by conventual means of the type well known to those skilled in the art such as, for example, the ring and groove type bearings illustrated. Similarly, there are two areas of bearing contact between the middle gimbal mount 55 and inner gimbal mount 53, an annular ring and groove type bearing 91 and an annular cylindrical surface contact bearing 93. The latter bearing is positioned between the inner gimbal mount's synchro stator support wall 95 and the upper cylindrical portion of slip ring 79 while the lower flange 97 of slip ring 79 is rigidly attached to the lower housing wall 99 of middle gimbal mount 55. It can thus be seen that each of the three basic moving parts are supported at two annular bearings that are in bearing contact with one of the other two basic parts. Also, between upper annular bearing 87 and lower annular bearing 89 (between inner gimbal mount 53 and prism ring 57) there is an annular space defined by synchro stator support wall 95 and a synchro rotor support wall 101. These cylindrical walls 95 and 101 have, respectively, the annular synchro stator 85 and synchro rotor 81 rigidly attached thereto.

Figure 3:
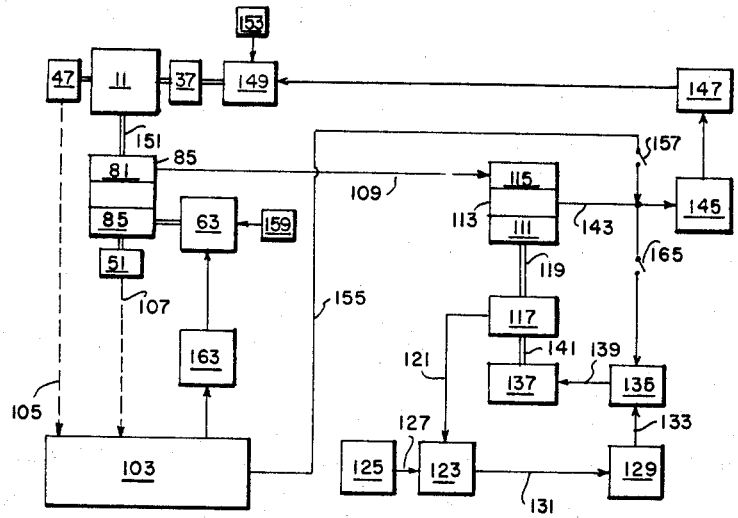
FIGURE 3 is a schematic block diagram of the azimuth laying system of the present invention.

Referring now to FIGURE 3, there is illustrated in "block" form a schematic view from which the operation of the system of the present invention may be visualized. In this figure, solid lines indicate electrical communication paths, double solid lines indicate mechanical connections and broken lines indicate optical communication paths, and, in the case of the electrical and optical paths, the direction of the signal from the component generating the signal to the component receiving the signal is illustrated by the use of an arrow head. A ground based two-channel autocollimator theodolite 103 is provided with a conventional penta-mirror arrangement to maintain acquisition of a prism being monitored even in the presence of translational movements of the prisms. For further information on the theodolite construction, reference is made to the above cited Vyce patent (No. 3,002,419) and to pages 62–69, Missiles and Rockets, Sept. 30, 1963. The theodolite 103 is capable of monitoring two prisms simultaneously by frequency sensitive elements in the theodolite which distinguish between the light reflected by each of the two prisms. The prisms are tinted so as to reflect either near or far infra-red light. For the purposes of illustration the near infra-red prism has been termed the "blue" prism ring prism 51 mounted on the prism ring 57 (see FIGURES 1 and 2) while the far infra-red prism has been termed the "red" inertial gimbal prism 47 mounted on the inertial gimbal 11 (see FIGURE 1). Thus the theodolite 103 transmits light toward each of the two prisms 51 and 47, and, when the prisms are in theodolite acquisition, blue and red light is reflected back toward the theodolite receiving apparatus along paths 107 and 105, respectively. The red prism 47 is mechanically connected to the inertial gimbal 11 so that when the reflected light beam 105 is being received by the theodolite 103 the azimuth orientation of the inertial gambal 11 is known. The theodolite 103 is located on a Class A survey line and the longitudinal axis direction of the theodolite is known to an extreme accuracy. Light is transmitted along the theodolite's longitudinal axis and into a penta mirror arrangement (mentioned above and which will be described more fully hereinafter in connection with FIGURES 4 and 5) which includes two plane mirrors oriented in a face-to-face relationship with their planes intersecting at an angle of $\pi/4$ radians. It can be seen that, in this configuration, the penta mirror arrangement will reflect a properly directed light beam at an angle of $\pi/2$ radians to the incident light regardless of any slight differences in the angle of incidence of the light beam on the first mirror. Of course the light must be reflected by both of the two mirrors in the penta mirrow set. It suffices to say here that the direction of the light transmitted to the prisms 47 and 51 from the theodolite 103 is always perpendicular to a known theodolite direction and therefore parallel to a known direction. The penta mirror is permitted to translate along the longitudinal axis of the theodolite in order to compensate for sway or twisting of the vehicle in which the the inertial platform is located so that the inertial gimbal may remain aligned in reference to the theodolite transmitted and received light beam. The prisms 47 and 51 are constructed with their apices horizontal and the angle between their reflecting surfaces of $\pi/2$ radians. It can be seen that the light beam incident upon such a reflecting element will reflect light parallel to the incoming light beam in a vertical plane (a plane normal to the apex line of the prisms) while the angle of reflection will equal the angle of incidence in a plane which contains the apex line of the prisms (more accurately this plane must also be perpendicular to the face of the reflecting prism). The Vyce patent cited above also gives a description of the construction and operation of these reflective prisms. The blue prism 51 is also mechanically connected to the stator 81 of prism ring assembly synchro transmitter 83. The inertial gimbal 11 is similarly mechanically connected to the synchro rotor 85 of the synchro transmitter so that the angular relationship of the synchro rotor and stator may be determined and an electrical signal representative of this angular relationship transmitted through electrical connection 109 to the rotor 111 of a ground based synchro receiver 113. It can be seen that if the synchro stator 81 is positioned to a known heading the angular relationship of synchro rotor 85 to this known direction will make the orientation of the rotor 85 and therefore the inertial gimbal 11 known. The method in which this information is used is to energize synchro rotor 111 of the synchro receiver 113 with electrical energy indicative of the position of the inertial gimbal 11 and essentially positions rotor 111 to the position of the inertial gimbal 11. In operation, as is implied from the above, the theodolite 103 initially acquires both the red and blue prisms 47 and 51. At this time a "zero" reference is established between the synchro stator and rotors 81 and 85 of the synchro transmitter 83. This reference is transmitted to the synchro receiver 113 through electrical connection 109 and represented in rotor 111. The stator 115 of the synchro receiver 113 is then "zeroed" with rotor 111. This reference is then transmitted mechanically to an optical encoder 117 through mechanical connection 119 and the electrical signal generated by the optical encoder 117 is transmitted via electrical connection 121 to the launch control computer 123 where it is stored as the reference direction. Optical encoder 117 may be of any of the well known types which can, by optical means, convert a shaft position into a digital electrical pulse output representative of the angular position of the shaft. The shaft is, in the block diagram of FIGURE 3, indicated by the mechanical connection 119.

The time functional desired azimuth, which is generated in a program source 125 and fed into the computer 123 by electrical lead 127 is compared with the stored reference direction and changes made in the position of synchro receiver stator 115 so that the stator position is aligned to the desired mission azimuth. The result of the comparison of the optical encoder 117 output and that of the desired azimuth at that particular instant is transmitted from the computer 123 to a digital to analog converter 129 by connection 131 and the analog output of converter 129 is transmitted by connection 133 to an amplifier 135. This amplified analog signal, which is representative of the difference between the position of synchroreceiver stator 115 and the desired mission azimuth from the program source 125, is utilized to drive a motor-tachometer 137 through input lead 139. The motor-tachometer 137 mechanically drives the synchro stator 115 to the desired azimuth by mechanical connections 141 and 119 (which are inter-connected through optical encoder 117). Thus synchro receiver stator 115 will always be positioned to the time functional mission azimuth for the missile based on a launch at that instant.

It can be seen now that, when the synchro transmitter stator 81 is held in a "zero" reference position by the blue prism 51 being maintained in acquisition by theodolite 103, the actual position of the inertial gimbal 11 will position rotor 85 so that a signal representative of the inertial gimbal 11 position will be transmitted to and position synchro receiver rotor 111. Based on the "zero" position indication previously obtained by the launch control computer 123, the synchro receiver stator 115 is continuously positioned to a new azimuth position. The difference in the position of the synchro receiver stator 115 and rotor 111 is reduced to an electrical signal which is fed by electrical connection 143 to an integrator-amplifier 145. This signal is then fed to a torquer amplifier 147 which, in turn, drives a Y-gyro torquer 149. The Y-gyro torquer mechanically torques the Y-gyro 37 moving the inertial gimbal about its Y-axis which is oriented along the local (launch pad) vertical. As the inertial gimbal 11 is rotated about its Y-axis, synchro transmitter rotor 85 is mechanically repositioned by mechanical connection 151.

The new position of rotor 85 relative to stator 81 will result in a different signal being transmitted in connection 109 to the synchro receiver rotor 111. When the rotor 111 is in alignment with stator 115 a null signal will be present in connection 143 causing the Y-gyro torquer to cease further movement of the inertial gimbal 11. Thus it can be seen that the inertial gimbal will remain positioned according to the desired azimuth fed into the launch computer 123.

It remains to describe the initial acquisition of the prisms 47 and 51 by the theodolite 103 and the servo loop which keeps the blue prism 51 in theodolite acquisition. When the missile is positioned on the launch pad and it is nearing the time of launch, all electrical connections between ground based equipment and missile systems are made through a missile umbilical connection. Directed light rays are transmitted by the theodolite 103 toward the missile's inertial platform position through an optical window in the missile skin. A bias voltage is applied to the Y-gyro torquer 149 by a Y-gyro torquer bias source 153 which torques the inertial gimbal 11 until reflected light from the red prism 47 is received by the theodolite 103. Within the theodolite there is a lead sulfide detection means which detects when the reflected light beam is moving from a center position and also the direction of such movement (see the Vyce patent cited above). This detection means generates a signal representative of the direction the reflected light beam has moved off center and this signal is transmitted directly to integrator-amplifier 145 by lead 155 and a portion of lead 143. During the acquisition of and while maintaining prism 47 in optical alignment switch 157 is closed. With the inertial gimbal fixed in azimuth orientation by this servo loop, prism ring bias source 159 supplies a bias voltage to a prism ring servo motor 63 which mechanically rotates the prism ring 57 upon which the blue prism 51 is rigidly mounted until light reflected from this prism is received by the theodolite. Again the movement of the reflected light beam is detected and a signal representative of such movement is fed to a modulator-amplifier 163 which drives servo motor 63 to maintain the blue prism 51 in acquisition. With both prisms in acquisition, switch 165 is closed allowing the launch control computer to direct that the signal received by the synchro receiver rotor 111 may, momentarily, be considered the reference azimuth to which stator 115 will be positioned. Thus the signal transmitted at this time in electrical connection 109 will be the reference or "zero" position. When the synchro receiver has been nulled (i.e. no output voltage present in lead 143), switches 157 and 165 are opened completing the reference establishing operation. The alignment of the inertial gimbal then takes place as described above with the program source 125 feeding the desired azimuth to the computer 123. The red inertial gimbal prism 47 is then no longer maintained in acquisition by the theodolite 103 but moves out of view of the theodolite as the inertial gimbal is torqued to the desired launch azimuth orientation.

Figure 4:
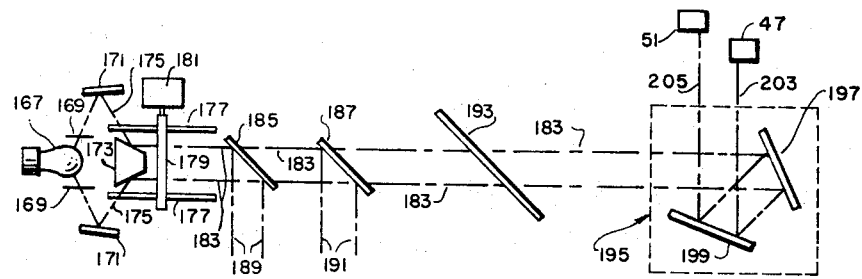
FIGURE 4 is a schematic view of a portion of the azimuth laying system illustrating the paths taken by light leaving the theodolite and impinging upon the stable platform prisms.

Referring now to FIGURE 4, there is shown in schematic representation the theodolite, penta mirror and stable platform prisms with the radiant light energy leaving the autocollimator indicated. Light energy from incandescent lamp 167 passes through lamp windows 169 and is condensed and reflected by a pair of condenser mirrors 171 to slit sensing prism 173. The condensed light rays 175 are made alternatively incident on either side of the nose of prism 173 by chopper blades 177 supported on spindle 179 and driven by chopper motor 181. The light rays 183 leaving prism 173 pass through uncoated glass beam splitter 185 and dichroic beam splitter 187. The energy loss from these two beam splitters (whose function will become apparent presently) is indicated by light rays 189 and 191, respectively. The light rays 183 then pass through pellicle 193 to penta mirror unit 195 consisting of two reflective surfaces 197 and 199 in face-to-face relationship but whose planes intersect at an angle of $\pi/4$ radians. The entire penta mirror unit 195 is mounted on a track (not shown) and allowed to translate along the direction of the incoming light rays 183 as indicated by the arrows 201. The light rays 183 thus are incident upon mirror 197 which reflects the rays to mirror 199. The light rays 203 and 205 leaving the penta mirror unit 195 are the light rays which are incident upon the inertial gimbal (red) prism 47 and the prism ring (blue) prism 51.

Figure 5:
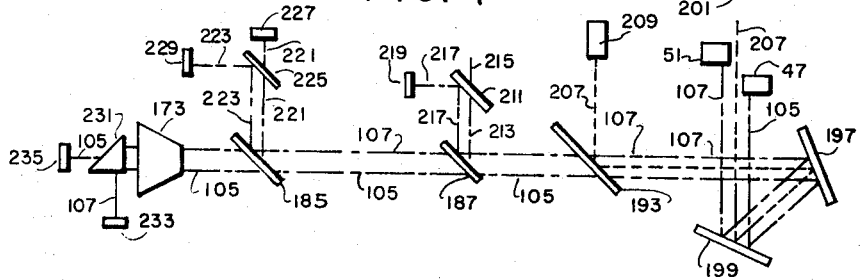
FIGURE 5 is a schematic view of a portion of the azimuth laying system illustrating the paths taken by light reflected from the stable platform prisms to the theodolite detectors.

Referring now to FIGURE 5, the light energy re-entering the autocollimator theodolite is indicated. Visual light rays 207 reflected from the missile (not shown) is reflected by penta mirror 199 and the penta mirror 197 to pellicle 193 where it is reflected into a television camera 209 for visual alignment of the instrument during the initial set-up phase.

As indicated above, the two stable platform reflecting prisms 47 and 51 are color coated so as to reflect light in the far infra-red and near infra-red spectrum, respectively. The light reflected by these prisms is not in the visual range. The light rays reflected by the two prisms, light rays 107 from the prism ring (blue) prism 51 and light rays 105 from the inertial gimbal (red) prism 47, are reflected by penta mirror 199 and then by penta mirror 197 parallel to the light rays 183 (see FIGURE 4) which left the autocollimator. The "red" and "blue" light rays 105 and 107, respectively, pass through pellicle 193 and are incident upon dichroic beam splitter 187 which, while passing a portion of the radiant energy, reflects a portion thereof to a color coated beam splitter 211 which passes the far infra-red light ray 213 as a loss indicated by light ray 215 and reflects the near infra-red light ray 217 to a sway detector 219. The output from sway detector 219 is amplified and used to drive a servo motor (not shown) which positions the penta mirror unit 195 along its one degree of freedom indicated by arrows 201 (FIGURE 4) to maintain the prism ring (blue) prism 51 in theodolite acquisition. The portion of light rays 105 and 107 passing beam splitter 187 are incident upon beam splitter 185 and again a portion thereof passes the beam splitter while a portion is reflected. The reflected portion 221 of the far infra-red ray 105 and the reflected portion 223 of the near infra-red ray 107 are then incident upon a color coated beam splitter 225 which passes the far infra-red ray 221 while reflecting the near infra-red ray 223. The far infra-red ray 221 is received by an inertial gimbal prism acquisition detector 227 while the reflected near infra-red ray 223 is received by a prism acquisition detector 229. The remaining portion of light rays 105 and 107 passing beam splitter 185 passes through slit sensing prism 173, and the near infra-red ray 107 is reflected by a color coated beam splitter 231 into a prism error detector 233 while the far infra-red ray 105 passes through beam splitter 231 into an inertial gimbal prism error detector 235.

Referring now to all of the figures, but with emphasis on FIGURES 3 and 5, the azimuth laying system operation will be briefly recapped. During the initial acquisition of the prisms 47 and 51 by the theodolite 103, as mentioned hereinbefore, Y-gyro torquer bias source 153 supplies a bias voltage to Y-gyro torquer 149 which torques Y-gyro 37 moving the inertial gimbal 11 and about its axis until the inertial gimbal prism acquisition detector 227 receives reflected light from inertial gimbal prism 47. When the prism 47 is in acquisition, switch 157 is closed allowing inertial gimbal prism error detector 235 to generate signals indicative of the acquisition error. These signals are transmitted from theodolite 103 to the Y-gyro torquer 149 by electrical connection 155 through integrator-amplifier 145, then to torquer amplifier 147 and, finally, the amplified signal is received by the Y-gyro torquer 149. With prism 47 maintained in acquisition, the inertial gimbal 11 is aligned to the known theodolite reference direction. Then prism ring bias source 159 supplies a bias voltage to prism ring servo motor 63 rotating prism ring 57 about its axis until light reflected by prism 51 is received by prism ring prism acquisition detector 229. With prism 51 acquisition, signals will be generated in prism ring detector error detector 233, modulated and amplified by modulator-amplifier 163. These signals are used to drive servo motor 63 to correct the error indication from detector 233 until a null exists. With both prisms in theodolite acquisition, switch 165 is closed allowing the difference signal from synchro receiver 113 to be amplified by amplifier 135 and the amplified signal used to drive motor-tachometer 137 until synchro receiver rotor 111 is in coincidence with synchro stator 115. (Synchro stator 115 has now been "positioned" to the position of the "zeroed" synchro transmitter stator 81 and rotor 85.) The signal out of optical encoder 117 (when there is a null signal on the electrical connection 143 from syncho receiver 113) is transmitted to and stored by the launch control computer 123 as the known reference direction from which comparison with the desired azimuth will be made. The deviations resulting from this comparison is transmitted to the digital-to-analog converter 129 and then amplifier 135. Switches 157 and 165 are broken and the amplified signal output from amplifier 135 drives motor-tachometer 137 to position synchro rotor 111 to the desired mission azimuth. A difference in the positions of synchro receiver stator 115 and rotor 111 will be transmitted through lead 143 to integrator-amplifier 145, and then to torquer amplifier 147 which drives Y-gyro torquer 149 to torque the Y-gyro 37 until the inertial gimbal 11 is in coincidence with the desired azimuth indicated by the position of synchro receiver rotor 111. As the inertial gimbal is torqued, synchro transmitter rotor 81 is repositioned and the signal in electrical connection 109 is indicative of the difference between the actual heading of the inertial gimbal 11 and the known reference direction of the syncho transmitter stator 85, which is held in position by theodolite 103 which has acquisition of prism ring prism 51.

The anticipated maximum errors in the system are:

|   | Seconds |
|---|---|
| 1. Synchro transmitter error | 12 |
| 2. Vehicle frame distortion error | 5 |
| 3. Prism ring prism tracking error | 8 |
| 4. Synchro receiver error | 5 |
| 5. Inertial gimbal prism tracking error | 8 |
| 6. Prism and accelerometer mounting error | 5 |
| 7. Computer output error | 3 |

The total square root of the sum of the squares error is then:

$(12^2+5^2+8^2+5^2+8^2+5^2+3^2)^{1/2}$
$=(356)^{1/2}$
$=18.8$
$=19$ seconds (rounding off to the accuracy of individual component errors).

It can be seen that the maximum anticipated system error of the azimuth laying system of the present invention is well within the criterion established for the alignment of the inertial gimbal on the Saturn class of space vehicles. In fact, it is anticipated that the system will be adequate for all space probe alignment applications in the forseeable future.

There has been described the invention in its novel aspects; however, it is to be understood that there has been shown merely an embodiment of the invention and that the invention is not to be limited to the structure shown and described. The present embodiment is therefore to be considered in all respects illustrative and not restrictive. Obviously numerous modifications and variations of the present invention within the invention's true spirit are possible in the light of the above teachings. It is therefore to be understood that within the scope of the appended claims the invention may be practiced otherwise than as specifically described herein.

What is claimed is:
1. In an azimuth alignment system for a stable platform adapted to be freely positioned relative to a fixed frame, said stable platform being rigidly fixed to a gimbal axle whose axis is perpendicular to the plane of said stable platform, said axle adapted to be aligned so its axis coincides with the vertical axis of the stable platform coordinate system, the other two axes of the coordinate system lying in the plane of said stable platform, and said axle being attached to a middle gimbal by pivots; the improvement comprising:
   a first light reflecting device mounted on said stable platform;
   a synchro transmitter assembly having a stator and a rotor co-axial to said gimbal axle, said stator being rotatable about said gimbal axle;
   a second light reflecting device;
   means rigidly connecting said second light reflecting device to said stator so said light reflecting device will rotate about the axis of said gimbal axle;

means rigidly connecting said rotor to said gimbal axle whereby rotation of said stable platform about the axis of said gimbal axle will rotate said rotor about the axis of said gimbal axle;

control means for alignment of said first and second light reflecting devices along a line of known azimuth and then for rotation of said stable platform about the axis of said gimbal axle according to a predetermined program.

2. The improvement as defined by claim 1 wherein said control means includes a theodolite adapted to monitor the position of said first and second reflecting devices along the line of known azimuth.

3. The improvement as defined by claim 2 wherein said reflecting devices are prisms.

4. The improvement as defined by claim 1 wherein said control means further includes:

an autocollimator theodolite;

means for torquing said stable platform about the axis of said axle in accordance with electrical signals;

means for torquing said transmitter stator about the axis of said gimbal axle in accordance with electrical signals;

acquisition means for providing electrical signals to said stable platform torquing means and said transmitter stator torquing means so as to cause said first and second reflecting devices to be rotated into alignment with said theodolite's longitudinal axis to thereby establish a zero reference between said transmitter stator and rotor;

a program source adapted to generate a predetermined signal representing the desired time function azimuth of said stable platform;

a computer means for comparing the reference direction of said receiver stator and the desired azimuth direction according to said program source and generating an electrical error signal representing any alignment difference;

means for disconnecting said acquisition means electrical signal to said stable platform torquing means and positioning said receiver stator to a position representative of the desired azimuth of the stable platform as indicated by the error signal of said computer;

said synchro receiver adapted to give an electrical error signal representative of the difference in alignment of its stator and rotor to said stable platform torquing means so as to cause a repositioning of said transmitter rotor which further causes the repositioning of said receiver rotor until it is in alignment with said receiver stator and a null error signal is presented to said stable platform torquing means.

5. The improvement as defined by claim 4 wherein:

said first light reflecting device is a prism adapted to reflect light of a particular wave length;

said second light reflecting device is a prism adapted to reflect light of another particular wave length;

said autocollimator theodolite is adapted to transmit light to and receive the reflected light from said prisms; and said autocollimator theodolite has means for distinguishing between the reflected light of said first prism and said second prisms.

References Cited

UNITED STATES PATENTS

| | | |
|---|---|---|
| 2,950,428 | 8/1960 | Gievers. |
| 2,955,474 | 10/1960 | Sutherland _____ 74—5 X |
| 3,002,419 | 10/1961 | Vyce. |
| 3,122,842 | 3/1964 | Wrigley et al. |
| 3,269,024 | 8/1966 | Fischer et al. |
| 3,274,883 | 9/1966 | Kern. |
| 3,279,086 | 10/1966 | Schlitt et al. _____ 33—226 |
| 3,326,076 | 6/1967 | Burg. |
| 3,342,982 | 9/1967 | Manoni. |

FOREIGN PATENTS

| | | |
|---|---|---|
| 1,026,764 | 4/1966 | Great Britain. |
| 1,346,783 | 11/1963 | France. |

OTHER REFERENCES

Getler, M.: Perkin-Elmer Theodolite System for Saturn Tested at Cape Canaveral, Missiles Dockets, Sept. 30, 1963, pp. 62–69.

JEWELL H. PEDERSEN, *Primary Examiner.*

A. A. KASHINSKI, *Assistant Examiner.*

U.S. Cl. X.R.

73—226; 33—72; 74—5.6